United States Patent [19]

Trägardh et al.

[11] Patent Number: 4,893,344
[45] Date of Patent: Jan. 9, 1990

[54] HEADSET HAVING A POST AURICLE MOUNT AND ARRANGED TO BE WORN ON A PERSON'S OUTER EAR

[75] Inventors: Jan Trägårdh, Copenhagen K; Bjarne Jönsson, Brønshøj; Finn Jensen, Struer, all of Denmark

[73] Assignee: GN Netcom A/S, Copenhagen, Denmark

[21] Appl. No.: 248,490

[22] Filed: Sep. 23, 1988

[30] Foreign Application Priority Data

Sep. 30, 1987 [DK] Denmark .............................. 5152/87

[51] Int. Cl.$^4$ .............................................. H04M 1/05
[52] U.S. Cl. ....................................... 381/187; 379/430
[58] Field of Search ................................ 381/187, 68.7

[56] References Cited

U.S. PATENT DOCUMENTS

| 1,587,643 | 6/1926 | Harman | 381/187 |
| 2,474,135 | 6/1949 | White | 381/187 |
| 2,513,746 | 7/1950 | Pohr | 381/187 |
| 3,826,378 | 1/1975 | Norris | 379/430 |
| 3,993,879 | 11/1976 | Larkin | 379/430 |
| 4,273,969 | 6/1981 | Foley et al. | 379/430 |
| 4,335,281 | 1/1982 | Scott et al. | 379/430 |
| 4,453,050 | 6/1984 | Enokido | 381/187 |
| 4,702,345 | 10/1987 | Janssen et al. | 381/187 |

FOREIGN PATENT DOCUMENTS

| 436377 | 10/1926 | Austria | 381/187 |
| 158391 | 10/1985 | European Pat. Off. | 381/68.7 |
| 60-10999 | 1/1985 | Japan | 381/187 |
| 1377237 | 12/1974 | United Kingdom | 381/187 |
| 2036505 | 6/1980 | United Kingdom | 381/169 |

Primary Examiner—Jin F. Ng
Assistant Examiner—Danita R. Byrd
Attorney, Agent, or Firm—Merchant, Gould, Smith, Edell, Welter & Schmidt

[57] ABSTRACT

A headset (1) with sound receiving microphone (6) and sound reproducing transducer (3) is arranged to be worn on a person's outer ear (2). For this purpose, the headset has a post auricle mount (9) with a lengthwise adjustable stabilizer (10) behind the ear, said post auricle mount being secured to the sound reproducing transducer housing (3) in a pivotable manner, hereby enabling it to be swivelled in several directions.

4 Claims, 4 Drawing Sheets

HEADSET HAVING A POST AURICLE MOUNT AND ARRANGED TO BE WORN ON A PERSON'S OUTER EAR

TECHNICAL FIELD

The invention relates to a headset which is adjustable.

BACKGROUND

Such headsets are known in different configurations. From the description of U.S. Pat. No. 3,862,378 is known a headset having a post auricle mount which is hinged to the transducer housing by means of a spring-loaded hinge, and from the description of U.S. Pat. No. 4,273,969 is known a headset with a post auricle mount which can be secured to the outer ear, namely to the lobe of the ear. and by means of a clamping member. The object of these securing arrangements is to prevent the headset from sitting too loosely on the ear during use, and moreover to give the user the impression that the headset is sitting firmly, because it can constantly be felt by the user.

The object of the invention is to present a headset which can be adjusted for the individual user, and notably in such a manner that the user is not aware of the headset. At the same time herewith, the headset can still be held so firmly that both the receiver and the transducer remain sitting in the desired position.

This object is achieved by configuring the headset according to the invention as characterized in the claims. By making the post auricle mount adjustable lengthwise, the user can in fact change the size of the post auricle mount, namely its length, thus providing an individual adjustment behind the ear, whereby a much greater user comfort is achieved.

When the headset according to the invention is configured appropriately, the possibly is provided for many different technical solutions to the lengthwise adjustment, e.g. in such a way that a balance is achieved from the point of view of weight, regardless of whether the displacement by the individual user is great or small.

When the headset according to the invention is configured appropriately, a particularly advantageous shape is achieved, which more or less surrounds the outer ear regardless of how far the stabilizer is drawn out of the post auricle mount. One can thus achieve a very great degree of adjustment to the ear and shape of the individual user's head. For the individual user, it is often the case that there are several optimum adjustments of the stabilizer which can thus be selected between, and one thus avoids the known inconveniences, e.g. pointloading, of the known headsets.

The headset according to the invention is preferably configured with a stabilizing part, whereby adjustment can be carried out without problems after the headset has been placed correctly on the outer ear. This form of adjustment also provides the possibility of changing between different positions during use.

When the headset according to the invention is configured appropriately, further possibilities are provided for optimum adjustment. Moreover, by turning the post auricle mount in relation to the sound reproducing transducer housing, the headset can be adapted as desired for the right or the left ear. It is thus not necessary to manufacture parts arranged especially for the right or left ear.

When the headset according to the invention is configured appropriately, possibilities of further adjustment are achieved, in that it becomes possible to change the stabilzer with a stabilizer of another length or slightly different shape, but without giving rise to any risk of the stabilizer being removed inadvertently.

BRIEF DESCRIPTION OF THE DRAWINGS

The invention will now be described in more detail with reference to the drawing, which shows a preferred embodiment of the invention, and where.

DETAILED DESCRIPTION OF THE PREFERRED EMBODIMENT

Figure 1:
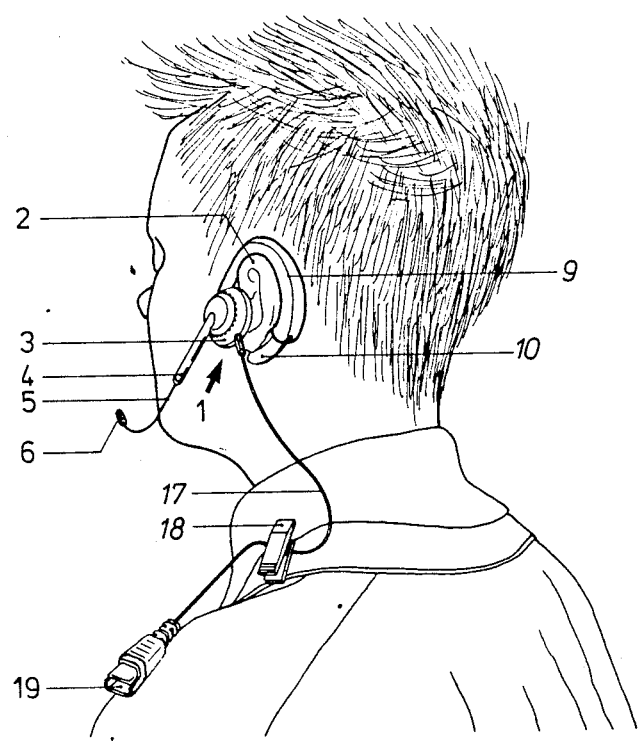
FIG. 1 shows the headset according to the invention during normal use.
Figure 2:
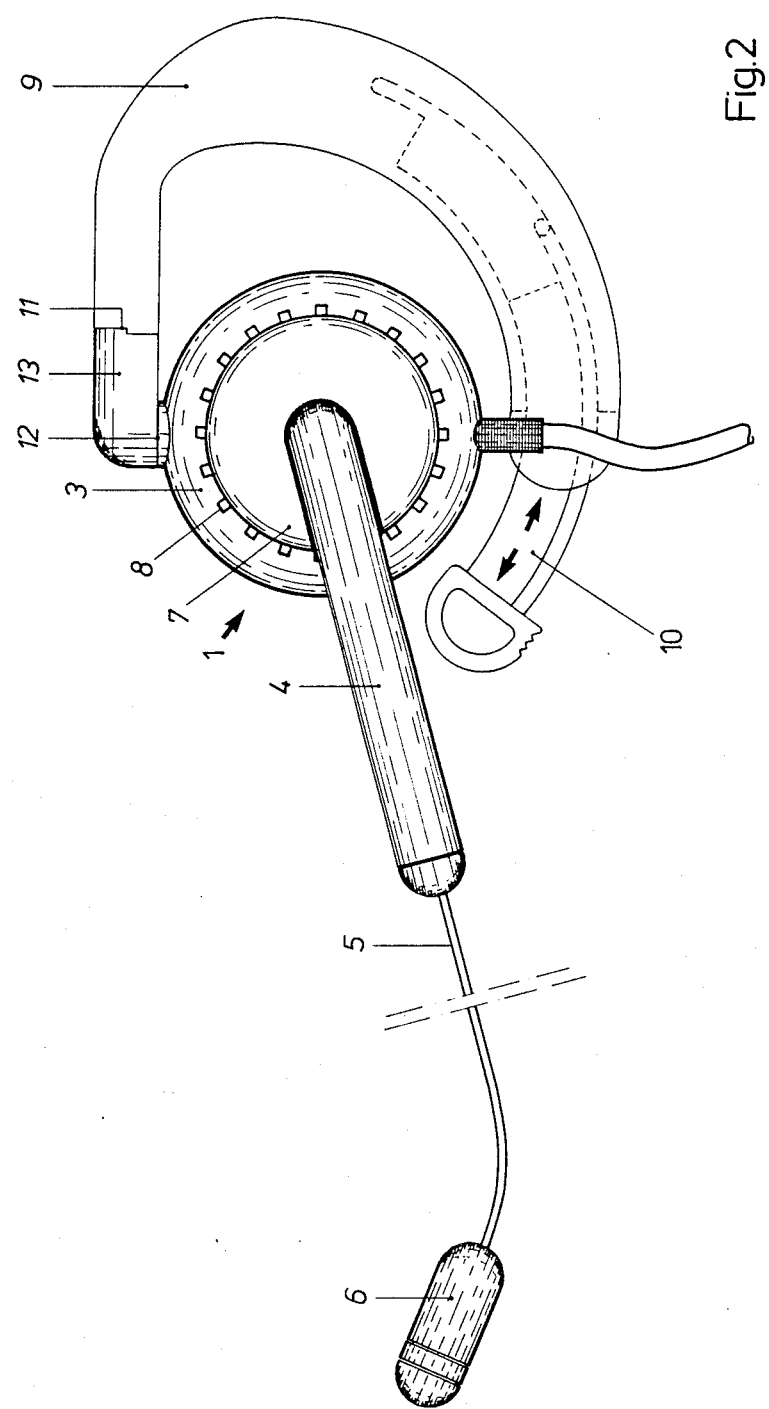
FIG. 2 shows the headset as a whole and on a larger scale.

In FIG. 1 of the drawing, the headset 1 according to the invention is seen placed on a person's left ear, where the necessary wire 17 is relieved by means of a holding element 18, for example a clamp which is fixed firmly to the user's clothing, said wire being terminated with an electric plug 19, depending on where the headset 1 is to be coupled and used.

The headset comprises a sound reproducing housing 3 containing a transducer and which serves as seating for a telescopic microphone arm 4,5 on which the sound reproducing microphone 6 is mounted. On the housing 3 there is also a pivotably-mounted and curved post auricle mount 9, a so-called hook, with a curved stabilizer 10 which can be displaced telescopically in the hook 9 for individual adjustment.

FIGS. 2-7 show in detail how the headset 1 is configured and arranged. On the transducer housing 3 is mounted a pivotable, circular housing or holding element 7 for the microphone arm 4, and in the connection area between the sound reproducing transducer housing 3 and the holding element 7 sound holes 8 are placed annularly which provide the sound reproducing transducer with acoustic ventilation, while at the same time comprising a part of a friction coupling and a turning-limit stop. This pivotable joint can turn approx. 290°. The microphone are 4,5 has a lengthwise adjustment of approx. 3 cm, and the microphone arm 4 can be swivelled approx. 60° out from the plane of the transducer housing. By telescopic withdrawal, the stabilizer 10 can change the length of the hook 9 up to approx. 3 cm.

Figure 3:
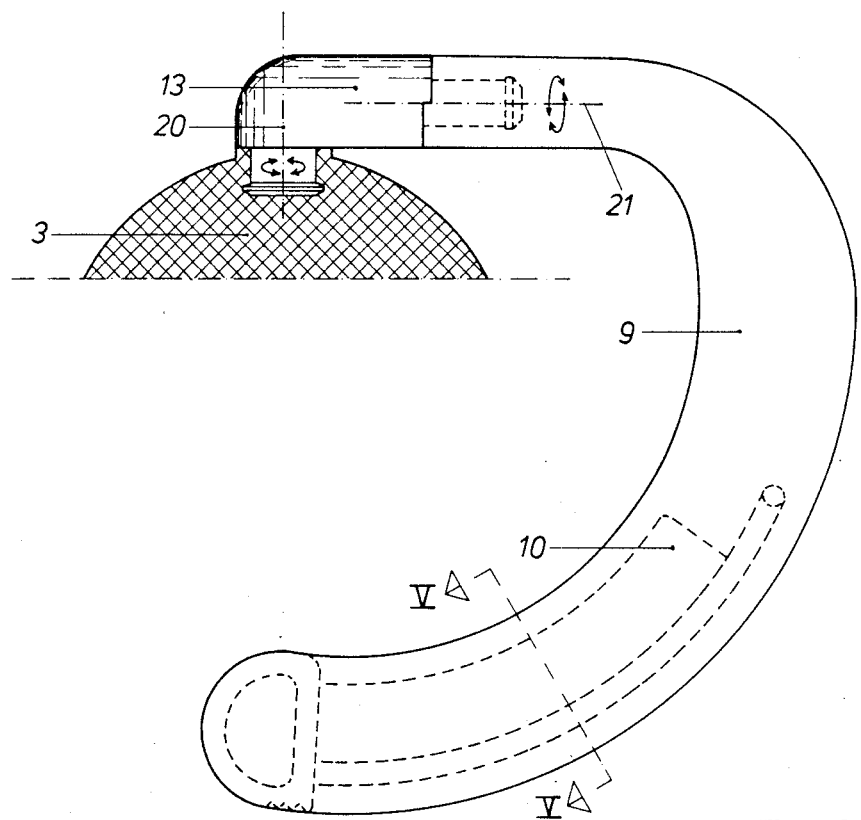
FIG. 3 shows the post auricle mount of the headset on an even larger scale.
Figure 4:
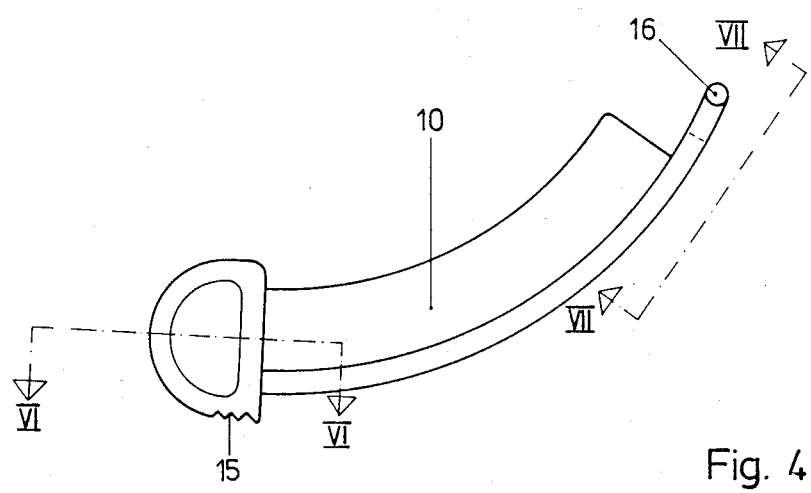
FIG. 4 shows the stabilizer for the post auricle mount.
Figure 5:
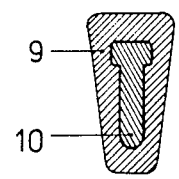
FIG. 5 shows a plane section seen in direction V—V in FIG. 3.
Figure 6:
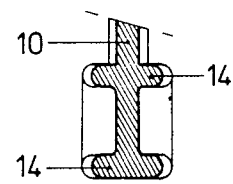
FIG. 6 shows a plane section in direction VI—VI in FIG. 4.
Figure 7:
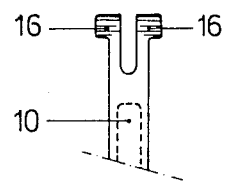
FIG. 7 shows the one end of the stabilizer seen in the direction VII—VII, similarly in FIG. 4.

In FIG. 3 it will be seen that the ear hook 9 can be pivoted around the axes 20 and 21 in relation to the transducer housing 3. This is achieved by means of a pivotable joining link 13, hereby providing the possibility of optimum adjustment for comfort. Moreover, by turning around these axes and by turning the holding element 7 with the microphone arm 4 in relation to the housing 3, one can adapt the headset 1 for use on the left or the right ear as desired.

The stabilizer 10 can be configured in many different ways. In FIGS. 4-7 is seen one example of a telescopically extractable stabilizer of plastic which can be pushed completely into the hollow hook 9, which is similarly of plastic. The hook 9 and the stabilizer 10 are curved and have substantially the same curvature. The stabilizer 10 has a T-shaped cross-sectional profile, see FIG. 5, and is terminated with a profiled head 14, see FIG. 6, with finger-grip 15 in the form of serrations. The innermost end of the stabilizer 10 is provided with flexible locking pegs 16, see FIG. 7, thus enabling the stabilizer to be inserted and removed and possibly replaced, without the user being able to remove the stabilizer inadvertently during adjustment and use.

The microphone 6, the transducer housing 3, the holding element 7, the microphone arm 4, the pivot link 13 and the ear hook 9 can be made of polyamide, the microphone arm 5 can be a thin steel tube, and the stabilizer 10 can be produced of polyoxymethylene, a plastic material, also known by the trademark HOSTOFORM, but naturally all of the parts can be produced of many other well-suited plastic materials in any desirable colour.

We claim:
1. A headset with sound receiving microphone and sound reproducing transducer, arranged to be worn on a person's outer ear, comprising
   a curved post auricle mount arranged to be positioned behind the ear and configured to be lengthwise adjustable, said mount including a stabilizer part having substantially the same curvature as the mount, and being extractable from said mount, said mount further being coupled to said sound reproducing transducer by a joining link means for providing rotation of said mount in two orthogonal axis.
2. A headset according to claim 1 wherein said stabilizer part includes a finger grip portion.
3. A headset according to claim 1 wherein said stabilizer part is a unitary plastic replaceable unit.
4. A headset according to claim 1 wherein said stabilizer part has a T-shaped cross-sectional profile and at one end is rounded with a plurality of finger-grip serrations.

* * * * *